United States Patent
Poulos et al.

(10) Patent No.: US 10,126,553 B2
(45) Date of Patent: Nov. 13, 2018

(54) CONTROL DEVICE WITH HOLOGRAPHIC ELEMENT

(71) Applicant: MICROSOFT TECHNOLOGY LICENSING, LLC, Redmond, WA (US)

(72) Inventors: Adam Poulos, Sammamish, WA (US); Lorenz Henric Jentz, Seattle, WA (US); Cameron Brown, Bellevue, WA (US); Anthony Ambrus, Seattle, WA (US); Arthur Tomlin, Kirkland, WA (US); James Dack, Seattle, WA (US); Jeffrey Kohler, Redmond, WA (US); Eric Scott Rehmeyer, Kirkland, WA (US); Edward Daniel Parker, Kirkland, WA (US); Nicolas Denhez, Seattle, WA (US); Benjamin Boesel, Cornelius, NC (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/184,681

(22) Filed: Jun. 16, 2016

(65) Prior Publication Data

US 2017/0363867 A1    Dec. 21, 2017

(51) Int. Cl.
*G02B 27/01* (2006.01)
*G06T 19/00* (2011.01)

(52) U.S. Cl.
CPC ..... *G02B 27/0103* (2013.01); *G02B 27/0172* (2013.01); *G02B 27/0179* (2013.01);
(Continued)

(58) Field of Classification Search
CPC .................................................. G06T 19/006
See application file for complete search history.

(56) References Cited

U.S. PATENT DOCUMENTS

| 6,512,607 B1 | 1/2003 | Windsor et al. |
| 7,173,604 B2 | 2/2007 | Marvit et al. |

(Continued)

FOREIGN PATENT DOCUMENTS

| WO | 2014088972 A1 | 6/2014 |
| WO | 2015167549 A1 | 11/2015 |

OTHER PUBLICATIONS

"The Playroom", Published on: Apr. 13, 2015, Available at: https://www.playstation.com/en-in/games/the-playroom-ps4/.
(Continued)

*Primary Examiner* — Joseph Haley
(74) *Attorney, Agent, or Firm* — Alleman Hall Creasman & Tuttle LLP

(57) ABSTRACT

A head-mounted display device may display a holographic element with a portable control device. Image data of a physical environment including the control device may be received and used to generate a three dimensional model of at least a portion of the environment. Using position information of the control device, a holographic element is displayed with the control device. Using the position information, it is determined that the control device is within a predetermined proximity of either a holographic object or a physical object. Based on determining that the control device is within the predetermined proximity, the displayed holographic element is modified.

20 Claims, 9 Drawing Sheets

(52) U.S. Cl.
CPC ...... *G06T 19/006* (2013.01); *G02B 2027/014* (2013.01); *G02B 2027/0127* (2013.01); *G02B 2027/0134* (2013.01); *G02B 2027/0138* (2013.01); *G02B 2027/0174* (2013.01); *G02B 2027/0178* (2013.01); *G02B 2027/0187* (2013.01)

(56) References Cited

U.S. PATENT DOCUMENTS

| | | | |
|---|---|---|---|
| 7,854,684 | B1 | 12/2010 | Freeman et al. |
| 8,350,810 | B2 | 1/2013 | Robbins et al. |
| 8,696,458 | B2 | 4/2014 | Foxlin et al. |
| 8,743,224 | B2 | 6/2014 | Harple et al. |
| 9,223,152 | B1 | 12/2015 | Kress et al. |
| 2007/0222746 | A1 | 9/2007 | LeVine |
| 2007/0286596 | A1 | 12/2007 | Lonn |
| 2010/0225779 | A1 | 9/2010 | Muukki |
| 2010/0302247 | A1 | 12/2010 | Perez et al. |
| 2011/0181497 | A1* | 7/2011 | Raviv .............. G02B 27/017 345/8 |
| 2012/0092328 | A1 | 4/2012 | Flaks et al. |
| 2012/0203453 | A1 | 8/2012 | Lundquist et al. |
| 2013/0137076 | A1 | 5/2013 | Perez et al. |
| 2013/0222874 | A1 | 8/2013 | Sung et al. |
| 2013/0328762 | A1 | 12/2013 | McCulloch et al. |
| 2013/0328927 | A1* | 12/2013 | Mount .............. G06T 19/006 345/633 |
| 2014/0028712 | A1 | 1/2014 | Keating et al. |
| 2014/0049558 | A1 | 2/2014 | Krauss et al. |
| 2014/0049559 | A1 | 2/2014 | Fleck et al. |
| 2014/0086124 | A1 | 3/2014 | Knowles |
| 2014/0098018 | A1 | 4/2014 | Kim et al. |
| 2014/0162730 | A1 | 6/2014 | Kim |
| 2014/0168261 | A1 | 6/2014 | Margolis et al. |
| 2014/0267598 | A1 | 9/2014 | Drouin et al. |
| 2014/0282008 | A1 | 9/2014 | Verard et al. |
| 2014/0313225 | A1 | 10/2014 | Lee et al. |
| 2014/0364209 | A1* | 12/2014 | Perry .............. G06F 3/013 463/31 |
| 2014/0375679 | A1 | 12/2014 | Margolis et al. |
| 2015/0042682 | A1 | 2/2015 | Jensen et al. |
| 2015/0043770 | A1 | 2/2015 | Chen et al. |
| 2015/0204687 | A1 | 7/2015 | Yoon et al. |
| 2015/0235434 | A1* | 8/2015 | Miller .............. G06T 19/006 345/633 |
| 2015/0244747 | A1 | 8/2015 | Wickenkamp et al. |
| 2015/0317834 | A1 | 11/2015 | Poulos et al. |
| 2018/0004308 | A1 | 1/2018 | McCulloch et al. |
| 2018/0005445 | A1 | 1/2018 | McCulloch et al. |

OTHER PUBLICATIONS

"PS4 Pulse", Retrieved on: Mar. 10, 2016 Available at: http://www.ps4playstation4.com/PS4-Controller-Pulse.

"D1—Evaluate the impact of a potential future development in HCI", Published on: Mar. 5, 2014, Available at: https://futuristicdevelopmentswithinhci.wordpress.com/2014/03/05/d1-evaulate-the-impact-of-a-potential-future-development-in-hci/.

Kinstner, Zach, "Hovercast VR Menu: Power at Your Fingertips", Published on: Feb. 14, 2015, Available at: http://blog.leapmotion.com/hovercast-vr-menu-power-fingertips/.

James, Paul, "Leaked HoloLens 'Actiongram' Videos Show What Interacting with Windows in AR Looks Like", Published on: Mar. 4, 2016, Available at: http://www.roadtovr.com/leaked-hololens-actiongram-videos-show-what-interacting-windows-in-ar-looks-like/.

Armstrong, Alex, "Microsoft HoloLens For a Mixed Reality Future", Published on: May 6, 2015, Available at: http://www.i-programmer.info/news/190-augmentedvirtual-reality-arvr/8549-microsoft-hololens-for-a-mixed-reality-future.html.

Volpe, Joseph, "Microsoft's mixed reality is for developers, not the public", Published on: Dec. 17, 2015, Available at: http://www.engadget.com/2015/12/17/microsoft-hololens-is-for-developers-not-the-public/.

"Holy Crap, This New Hololens Demo is Freaking Crazy", Published on: Oct. 6, 2015, Available at: https://www.youtube.com/watch?v=29xnzxgCx6l.

Molyneaux, D. et al., "Interactive Environment-Aware Handheld Projectors for Pervasive Computing Spaces," Proceedings of the 10th International Conference on Pervasive Computing (Pervasive'12), Jun. 18, 2012, Newcastle, United Kingdom, 18 pages.

Perl, T., "Cross-Platform Tracking of a 6DoF Motion Controller," Master's Thesis, Vienna University of Technology, Dec. 2012, 140 pages.

Heun, V. et al., "Smarter Objects: Using AR technology to Program Physical Objects and their Interactions," CHI '13 Extended Abstracts on Human Factors in Computing Systems (CHI EA '13), Apr. 27, 2013, Paris, France, 6 pages.

Schneider, N., "Virtual Reality Basics," Tom's Hardware Website, Available Online at http://www.tomshardware.com/reviews/virtual-reality-basics,4220.html, Oct. 12, 2015, 14 pages.

"Creating the first Apple Watch Wearable Hologram at Microsoft Visitor Center Seattle", Retrieved from <<https://www.youtube.com/watch?v=SOPskp4Z9WQ>>, Jul. 27, 2015, 2 Pages.

Morran, Chris, "Microsoft Shows off "Wearable" Holograms with HoloLens", Retrieved from <<http://consumerist.com/2015/10/06/microsoft-shows-off-wearable-holograms-with-hololens/>>, Oct. 6, 2015, 4 Pages.

"Non-Final Office Action Issued in U.S. Appl. No. 15/199,831", dated Nov. 22, 2017, 31 Pages.

Mamiit, Aaron, "Google Glass Could Display Holograms over the Real World in the Future", Retrieved from <<http://www.techtimes.com/articles/91610/20151005/google-glass-coulddisplay-holograms-over-the-real-world-in-the-future.htm>>, Oct. 5, 2015, 4 Pages.

"International Search Report and Written Opinion Issued in PCT Application No. PCT/US2017/037104", dated Sep. 5, 2017, 12 Pages.

"Non Final Office Action Issued in U.S. Appl. No. 15/199,742", dated Jun. 15, 2018, 17 Pages.

* cited by examiner

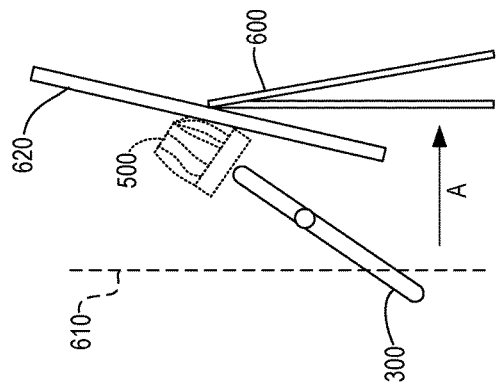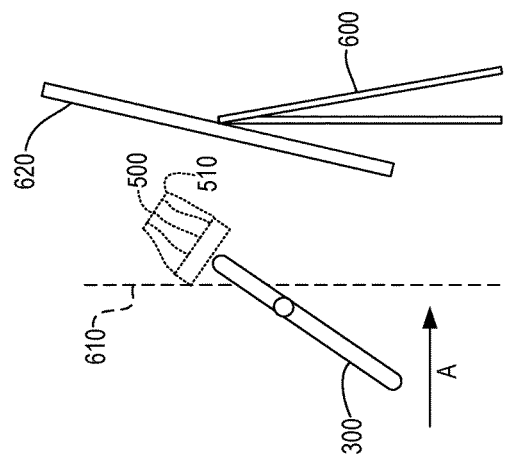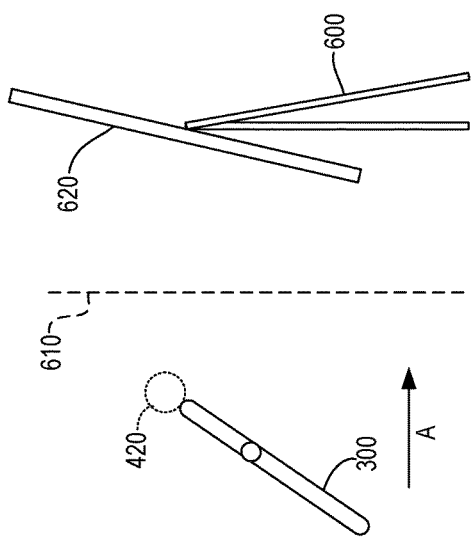

CONTROL DEVICE WITH HOLOGRAPHIC ELEMENT

BACKGROUND

Contextual status information may be displayed to a user of a computing device via a two-dimensional display screen. A user interface displayed on the screen may include text labels, progress bars or other visual elements to communicate information.

SUMMARY

A head-mounted display device and methods for displaying holographic element with a control device are disclosed herein. In one example, image data of a physical environment including the control device is received. A three dimensional model of at least a portion of the physical environment is generated using the image data. Position information of the control device within the physical environment is received. Based at least in part on the position information, the holographic element is displayed with the control device.

Based at least in part on the position information, the control device is determined to be within a predetermined proximity of either a holographic object displayed via the head-mounted display device or a physical object. Based at least in part on determining that the control device is within the predetermined proximity, the holographic element displayed via the head-mounted display device is modified.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 6-8 show a holographic element of a control device being modified according to an example of the present description.

DETAILED DESCRIPTION

The present descriptions relate to using a head-mounted display (HMD) device to display holographic elements with portable control devices. As described in more detail below, when a control device is within a predetermined proximity of either a holographic object or a physical object, the holographic element displayed via the HMD device may be modified.

Figure 1:
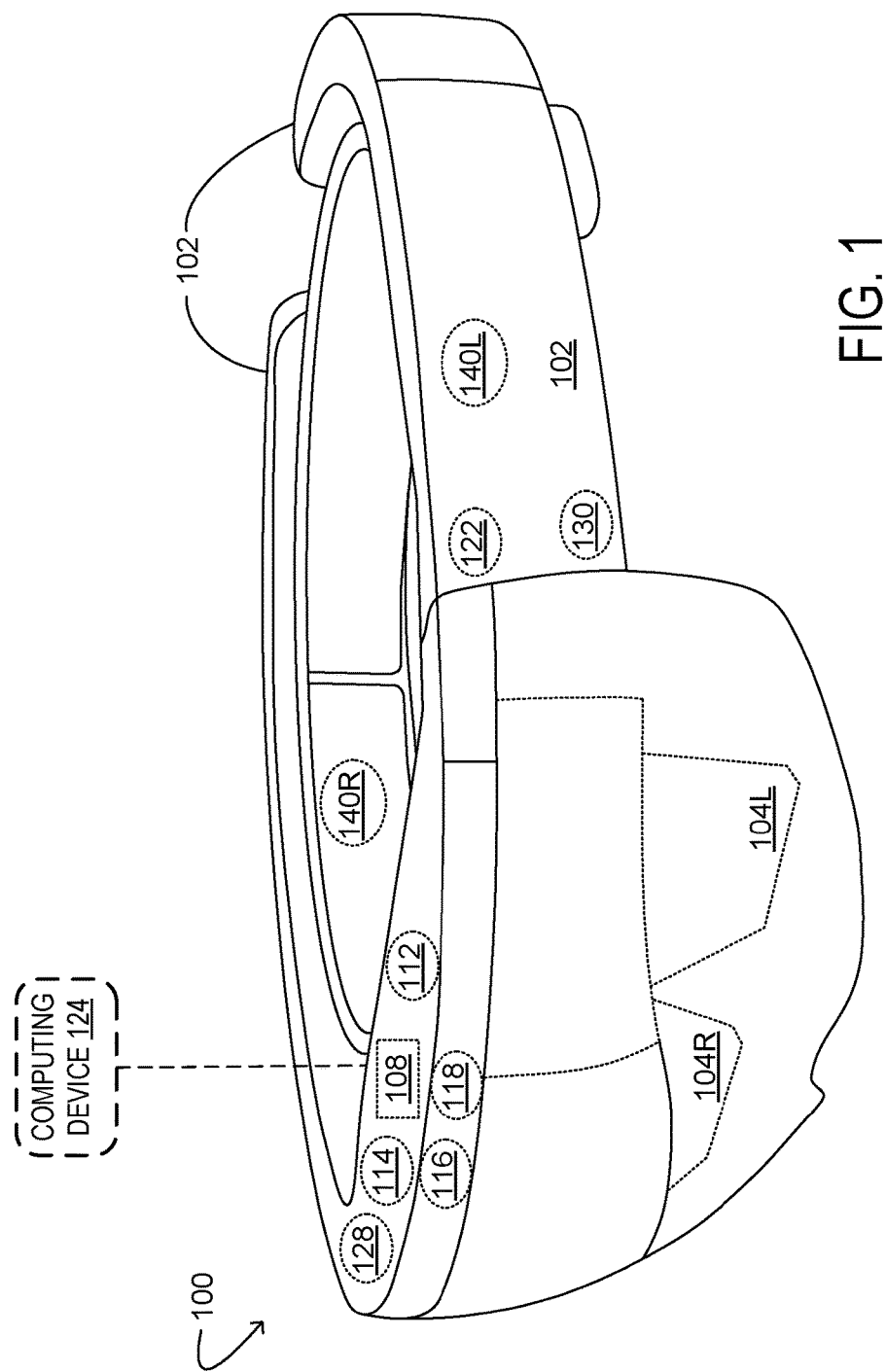
FIG. 1 shows a head-mounted display device for displaying holographic element with a portable control device according to an example of the present description.

In some examples, the HMD device may comprise an augmented reality display device. The augmented reality display device may include an at least partially see-through display configured to visually augment a view of a real world physical environment through the display. FIG. 1 illustrates an HMD device 100 that may be worn by a user according to an example of the present disclosure. In other examples an HMD device may take any other suitable form in which an at least partially see-through display is supported in front of a viewer's eye or eyes.

In the example of FIG. 1, the HMD device 100 includes a frame 102 that wraps around the head of a user to position at least partially see-through right display panel 104R and at least partially see-through left display panel 104L, close to the user's eyes. The frame supports additional stereoscopic, see-through display componentry as described in more detail below. HMD device 100 may be used in augmented-reality applications, where virtual display imagery is mixed with real-world imagery.

In this example HMD device 100 includes separate right and left display panels, 104R and 104L, which may be wholly or partially transparent from the perspective of the user, to give the user a clear view of his or her surroundings. A processor 108 is operatively coupled to the display panels 104R and 104L and to other display system componentry. The processor 108 includes logic and associated computer memory configured to provide image signals to the display panels 104R and 104L, to receive sensory signals, and to enact various control processes described herein.

The display panels 104R and 104L facilitate the delivery of holographic images to the eyes of a wearer of the HMD device 100. In this manner, the display panels 104R and 104L may be configured to visually augment an appearance of a real-world, three dimensional physical environment to a wearer viewing the physical environment through the panels.

Any suitable display technology and configuration may be used to display images via the at least partially see-through display panels 104R and 104L. For example, the panels may be configured to enable a wearer of the HMD device 100 to view a physical, real-world object in the physical environment through one or more partially transparent pixels that are displaying a virtual object representation. For example, the panels may include image-producing elements such as, for example, a see-through Organic Light-Emitting Diode (OLED) display.

As another example, the HMD device 100 may include a light modulator on an edge of the panels. In this example, the panels may serve as a light guide for delivering light from the light modulator to the eyes of a wearer. In other examples, the display panels may utilize a liquid crystal on silicon (LCOS) display. Additionally, while the example of FIG. 1 shows separate right and left display panels 104R and 104L, a single display panel extending over both eyes may be used in other examples.

The HMD device 100 may also include various sensors and related systems to provide information to the processor 108. Such sensors may include, but are not limited to, one or more inward facing image sensors 112, 114, one or more outward facing image sensors 116, 118, an inertial measurement unit (IMU) 122, and one or more microphones 130. The HMD device 100 also may include stereo loudspeakers 140R and 140L to broadcast audio to the wearer. The one or more inward facing image sensors 112, 114 may be configured to acquire image data in the form of gaze tracking data from a wearer's eyes (e.g., sensor 112 may acquire image data from one of the wearer's eyes, and sensor 114 may acquire image data from the other of the wearer's eye).

The processor 108 may execute instructions to determine gaze directions of each of a wearer's eyes in any suitable manner based on the information received from the image sensors 112, 114. For example, one or more light sources, such as infrared light sources, may be configured to cause a glint of light to reflect from the cornea of each eye of a wearer. The one or more image sensors 112, 114 may be configured to capture an image of the wearer's eyes. Images of the glints and of the pupils as determined from image data gathered from the image sensors may be used to determine an optical axis of each eye. Using this information, the processor 108 may execute instructions to determine a direction in which the wearer is gazing.

In other implementations, a different type of gaze sensor may be employed in the HMD device 100 to measure one or more gaze parameters of the user's eyes. Examples of gaze parameters measured by one or more gaze sensors may include an eye gaze direction or gaze vector, head orientation, eye gaze velocity, eye gaze acceleration, change in angle of eye gaze direction, and/or any other suitable tracking information.

The one or more outward facing image sensors 116, 118 may be configured to capture and/or measure physical environment attributes of the physical environment in which the HMD device 100 is located. In one example, image sensor 116 may include a visible-light camera configured to collect a visible-light image of a physical space. Further, the image sensor 118 may include a depth camera configured to collect a depth image of a physical space. More particularly, in one example the depth camera is an infrared time-of-flight depth camera. In another example, the depth camera is an infrared structured light depth camera.

Data from the outward facing image sensors 116, 118 may be used by the processor 108 to generate and/or update a three-dimensional (3D) model of the physical space. Data from the outward facing image sensors 116, 118 may be used by the processor 108 to identify surfaces of the physical space and/or measure one or more surface parameters of the physical space. The processor 108 may execute instructions to generate/update 3D models and identify surfaces of the physical space in any suitable manner. In one example, depth maps derived from depth data provided by the depth camera of image sensor 118 may be used to generate/update 3D models and identify surfaces of the physical space.

In some examples data from the outward facing image sensors 116, 118 may be used by the processor 108 to determine the location and orientation of a physical object in the physical environment. As described in more detail below, in some examples the HMD device 100 may track the location and orientation of a portable control device in the physical environment. Examples of a portable control device may include but are not limited to hand-held control devices, such as a baton-shaped device, and wearable control devices, such as a band or other wrist-worn device. In some examples, processor 108 may utilize images of a portable control device (e.g., position information) that are captured by the outward facing image sensors 116, 118 to determine the location and orientation of the control device.

In some examples and as described in more detail below, the control device may comprise one or more light sources, such infrared LED light(s), that may be tracked by the outward facing image sensors 116, 118 to determine the location and orientation of the control device. In some examples the controller may comprise outer marking material, such as infrared paint, that may be tracked by the outward facing image sensors 116, 118 to determine the location and orientation of the control device.

In some examples, the HMD device 100 may track the location and orientation of a control device using a magnetic field sensor 128, such as a magnetometer. In these examples, the control device may comprise magnetic field emitter that emits position information in the form of a magnetic field. As the control device moves relative to the HMD device 100, the magnetic field sensed by the magnetic field sensor 128 changes accordingly. The changing magnetic field may be used by the processor 108 to determine the location and orientation of the control device relative to the HMD device 100 in the physical environment.

In some examples a portable control device may comprise one or more cameras that capture image data. The HMD device 100 may receive position information in the form of images captured by the control device camera(s). Using such images, the processor 108 may determine the location and orientation of the control device relative to the HMD device 100 in the physical environment. In some examples, the control device may process such images and provide corresponding position data to the HMD device 100.

In some examples, two or more of the above-described techniques for determining the location and orientation of the control device may be combined and utilized together. In some examples, the HMD device 100 may receive or generate six-axis or six-degree of freedom (6DOF) location data that indicates or measures changes in location of the control device along three orthogonal spatial axes (e.g., x, y, and z) and changes in device orientation about three orthogonal rotation axes (e.g., yaw, pitch, and roll).

Data from the outward facing image sensors 116, 118 also may be used by the processor 108 to detect movements within a field of vice of the HMD device 100, such as gesture-based inputs or other movements performed by a wearer or by a person or physical object within the field of view. In one example, data from the outward facing image sensors 116, 118 may be used to detect user input performed by the wearer of the HMD device 100, such as a gesture (e.g., a pinching of fingers, closing of a fist, pointing with a finger or hand, etc.), that indicates an action to be taken, a selection of a hologram or other virtual object displayed via the display device, or other command.

Data from the outward facing image sensors 116, 118 also may be used by the processor 108 to determine direction/location and orientation data (e.g., from imaging environmental features) that enables position/motion tracking of the HMD device 100 in the real world physical environment. In some examples and as described above, such position/motion tracking may be performed with respect to a real world object, such as a hand-held or wearable control device. Data from the outward facing image sensors 116, 118 may be used by the processor 108 to construct still images and/or video images of the surrounding environment from the perspective of the HMD device 100.

Additionally or alternatively, information from outward facing image sensors 116, 118 and/or other sensors may be communicated to a remote computing device 124 responsible for generating and updating a model of the physical space. The HMD device 100 may be communicatively coupled to remote computing device 124 and/or other device(s) via a wired connection or a wireless connection to a network. In some examples, the network may take the form of a local area network (LAN), wide area network (WAN), wired network, wireless network, personal area network, or a combination thereof, and may include the Internet.

Computing device 124 may take the form of a server, networking computer, gaming console, mobile communication device, wearable computing device, desktop computer, laptop computer, tablet computer, set-top box (e.g. cable television box, satellite television box), or any other type of suitable computing device. In some examples, computing device 124 may comprise an embedded system within a larger electronic or mechanical device or system. Additional details regarding the components and computing aspects of the computing device 124 are described in more detail below with respect to FIG. 11.

The position and/or orientation of the HMD device 100 relative to the physical environment may be assessed so that augmented-reality images may be accurately displayed in desired real-world locations with desired orientations. As noted above, the processor 108 may execute instructions to generate a 3D model of the physical environment including surface reconstruction information that may be used to identify surfaces in the physical space. As described in more detail below, such surfaces may include one or more portable hand-held or wearable control devices.

The IMU 122 of HMD device 100 may be configured to provide position and/or orientation data of the HMD device 100 to the processor 108. In one implementation, the IMU 122 may be configured as a three-axis or three-degree of freedom (3DOF) position sensor system. This example position sensor system may, for example, include three gyroscopes to indicate or measure a change in orientation of the HMD device 100 within 3D space about three orthogonal axes (e.g., roll, pitch, and yaw). The orientation derived from the sensor signals of the IMU may be used to display, via the see-through display, one or more holographic images with a realistic and stable position and orientation.

In another example, the IMU 122 may be configured as a six-axis or six-degree of freedom (6DOF) position sensor system. Such a configuration may include three accelerometers and three gyroscopes to indicate or measure a change in location of the HMD device 100 along three orthogonal spatial axes (e.g., x, y, and z) and a change in device orientation about three orthogonal rotation axes (e.g., yaw, pitch, and roll). In some implementations, position and orientation data from the outward facing image sensors 116, 118 and the IMU 122 may be used in conjunction to determine a position and orientation (or 6DOF pose) of the HMD device 100.

In some examples, a 6DOF position sensor system may be used to display holographic representations in a world-locked manner. A world-locked holographic representation appears to be fixed relative to one or more real world objects viewable through the HMD device 100, thereby enabling a wearer of the HMD device 100 to move around a real world physical environment while perceiving a world-locked hologram as remaining stationary in a fixed location and orientation relative to the one or more real world objects in the physical environment.

In some examples and as described in more detail below, the HMD device 100 may display a world-locked hologram the form of a holographic element displayed in a world-locked manner with respect to a portable control device. For example and as described in more detail below, a holographic element in the form of a holographic sword blade may be displayed in a world-locked manner with respect to a hand-held baton-shaped control device, such that the holographic blade appears affixed to the end of the control device. Accordingly, as the user waves and moves the control device within the physical environment, the holographic blade appears attached to the end of the control device, thereby simulating a sword.

In other examples, the HMD device 100 may operate in a body-lock display mode in which one or more holographic objects may be displayed via the HMD device with body-locked positions. In a body-locked position, a holographic object appears to be fixed relative to the wearer of the HMD device 100, and the body-locked position of the holographic object appears to be moveable relative to real-world objects.

Optical sensor information received from the outward facing image sensors 116, 118 and/or position sensor information received from IMU 122 may be used to assess a position and orientation of the vantage point of the HMD device 100 relative to other real world physical objects. In some embodiments, the position and orientation of the vantage point may be characterized with six degrees of freedom (e.g., world-space X, Y, Z, pitch, roll, yaw). The vantage point may be characterized globally or independently of the real world physical environment.

The HMD device 100 may also support other suitable positioning techniques, such as GPS or other global navigation systems. Further, while specific examples of position sensor systems have been described, it will be appreciated that any other suitable sensor systems may be used. For example, head position or pose and/or movement data may be determined based on sensor information from any combination of sensors mounted on the HMD device 100 and/or external to the device including, but not limited to, any number of gyroscopes, accelerometers, inertial measurement units, GPS devices, magnetometers, cameras (e.g., visible light cameras, infrared light cameras, time-of-flight depth cameras, structured light depth cameras, etc.), communication devices (e.g., WIFI antennas/interfaces), etc.

The processor 108 may include a logic processor and the HMD device 100 may include volatile memory and non-volatile storage, as discussed in more detail below with respect to FIG. 11, in communication with the at least the partially see-through panels and various sensors of the HMD device 100.

Figure 2:
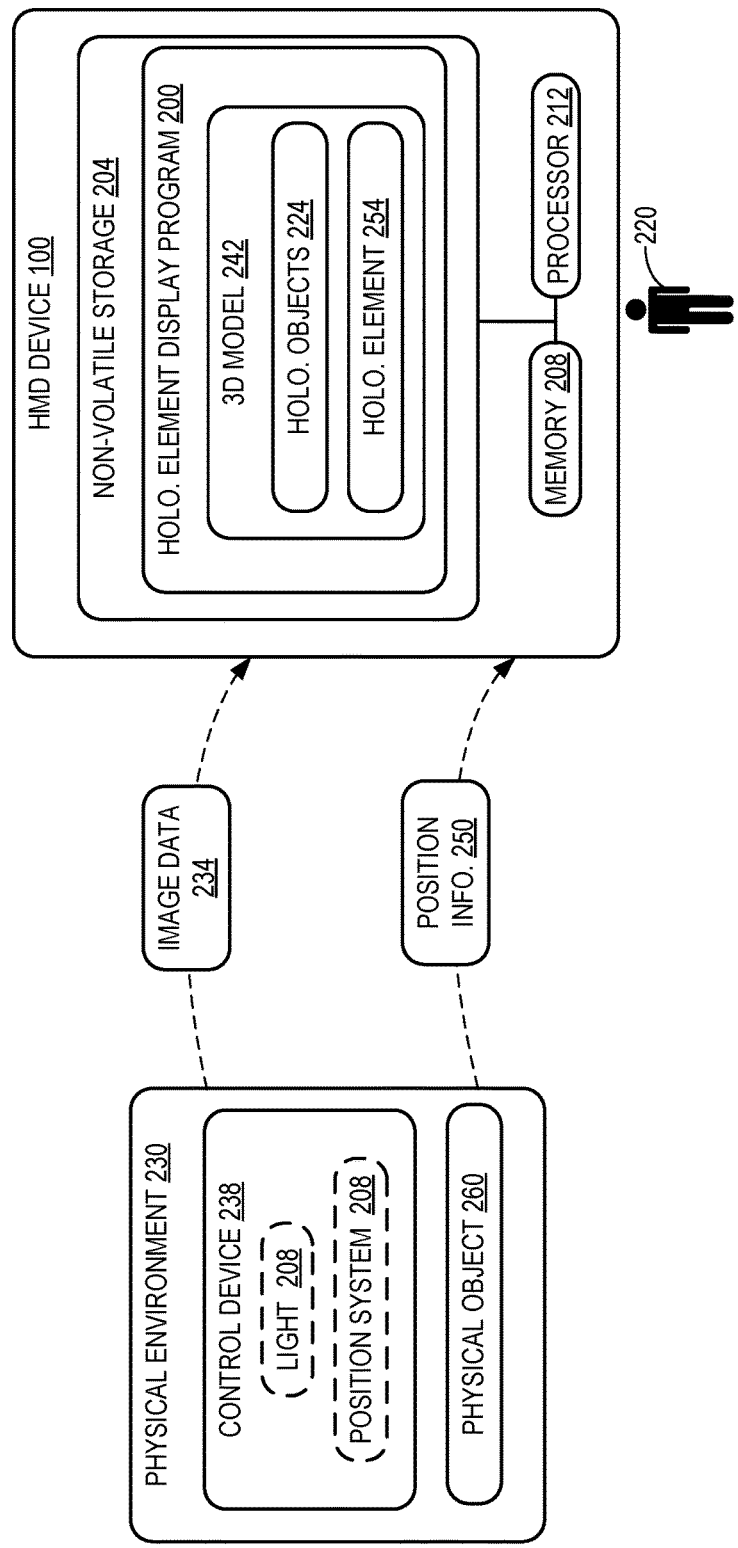
FIG. 2 is a schematic view of the head-mounted display device of FIG. 1 in a physical environment according to an example of the present description.

With reference now to FIGS. 2-7, example use cases illustrating aspects of the present disclosure will now be presented. As schematically shown in FIG. 2, the HMD device 100 may comprise a holographic element display program 200 stored in non-volatile storage 204. The holographic element display program 200 may be loaded into memory 208 and its instructions executed by processor 212 to perform one or more of the methods and processes for displaying a holographic element with a portable control device described herein.

In some examples HMD device 100 may display to a user 220 one or more holographic objects 224 that appear to be located in physical environment 230. For example and as noted above, the HMD device 100 may receive image data 234 of the physical environment 230 in which a portable control device 238 is located. Using the image data 234, a three dimensional model 242 of at least a portion of the physical environment 230 may be generated. The HMD device 100 also may receive position information 250 of the control device 238 within the physical environment 230. Using at least this position information 250, and as described in the examples discussed below, a holographic element 254 may be displayed to appear with the control device 238.

Figure 3:
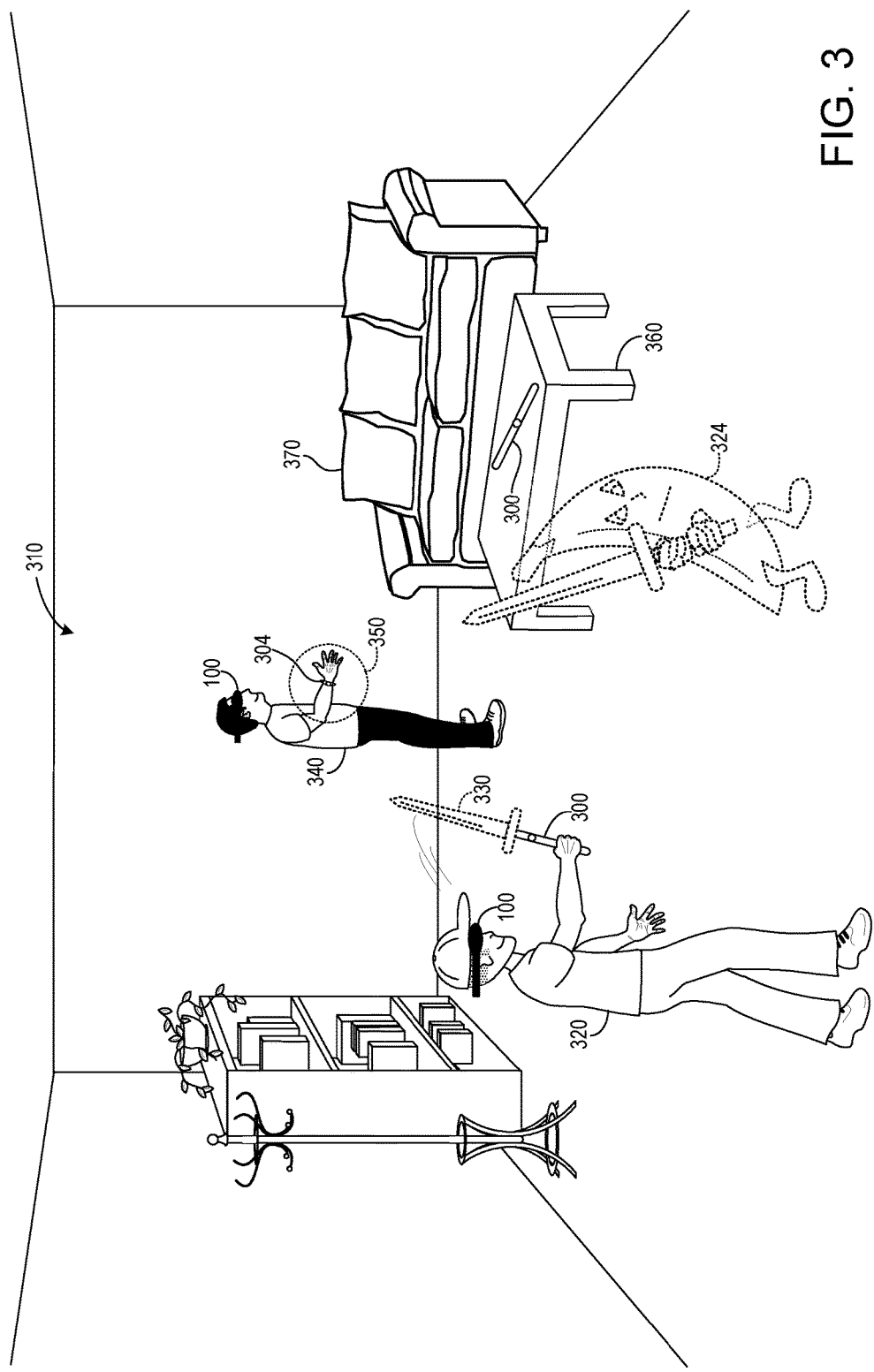
FIG. 3 shows two users wearing the head-mounted display device of FIG. 1 in a room according to an example of the present description.

In various examples the portable control device 238 may comprise a hand-held or wearable control device. With reference now to FIG. 3, in some examples the portable control device 238 may take the form of a hand-held baton 300 having a generally cylindrical shape. In other examples portable control devices 238 may take various other shapes and forms, such as spherical, cubical, rectangular, etc., and may include one or more handles for gripping. In other examples, portable control devices 238 may take the form of wearable devices. In the example of FIG. 3, a portable control device is shown the form of a wrist-worn band 304. In other examples wearable control devices may take the form of bracelets, watches, rings, arm bands, items of clothing, and any other suitable form of wearable device.

With reference again to FIG. 2, in some examples and based at least in part on the position information 250, the HMD device 100 may determine that a control device 238 is within a predetermined proximity of either a holographic object 224 displayed via the HMD device or a physical object 260 located in the physical environment 230. Based at least in part on determining that the control device is within the predetermined proximity, the holographic element display program 200 may modify the holographic element 254 displayed with the control device 238 via the HMD device 100. Where the control device 238 is determined to be within a predetermined proximity of a holographic object 224, such proximity may be determined by referencing the 3D model 242 of the physical environment 230, and determining a virtual distance between the control device and the holographic object in the 3D model.

With reference now to FIG. 3, in one example a user Andy 320 may be standing in room 310 and may wear the HMD device 100 shown in FIGS. 1 and 2 and described above. As noted above, HMD device 100 may comprise an at least partially see-through display configured to visually augment the view of user Andy 320 through the display of the three dimensional physical environment of room 310. For example, the HMD device 100 may display a holographic sword-wielding banana 324 to user Andy 320 as part of a first person swordplay game.

User Andy 320 may hold a portable control device in the form of baton 300. As noted above, the HMD device 100 may receive position information of the baton 300 within the room 310. In this example and using at least this position information, a holographic element in the form of a holographic sword 330 may be displayed extending from one end of the baton 300.

The HMD device 100 may display the holographic sword 330 to appear affixed to the end of the baton 300 in a world-locked manner. Accordingly, as Andy 320 moves and manipulates the baton 300, the sword 330 is displayed to move in a corresponding manner as if it were affixed to the baton. In some examples, Andy 320 may use the holographic sword 330 in an augmented reality gaming situation, such as to engage in a sword fight with the holographic banana 324.

In the example of FIG. 3, another user Greg 340 is wearing a wearable control device in the form of wrist-worn band 304. In this example, an HMD device 100 that is worn by Greg 340 displays a holographic element with the wrist-worn band 304 in the form of a holographic shield 350. Greg's HMD device 100 displays the holographic shield 350 to appear affixed to the band 304 in a world-locked manner. Accordingly, as Greg 340 moves his right hand the shield 350 is displayed to move in a corresponding manner as if it were affixed to the wrist-worn band 304. In some examples, Greg 340 may use the holographic shield 350 in an augmented reality gaming situation, such as to deflect holographic objects moving towards him.

Figure 4:
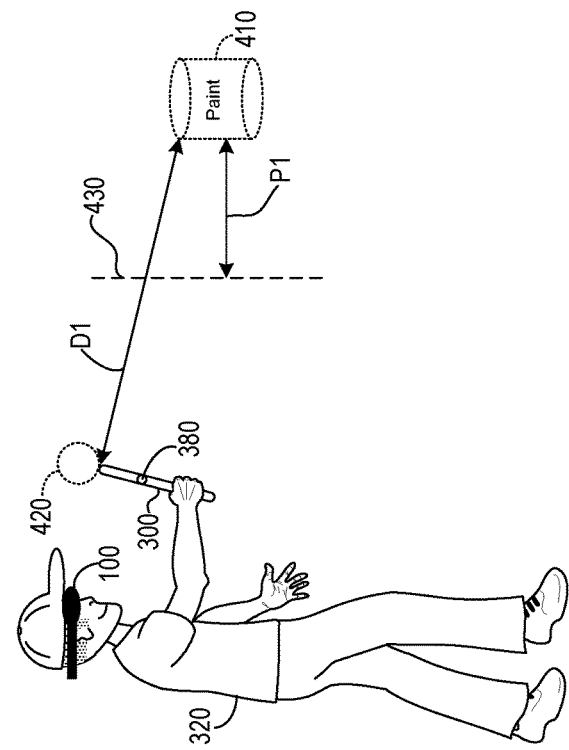

With reference now to FIG. 4, in one example user Andy 320 may hold baton 300 and may view a holographic paint 410 displayed via HMD device 100. In this example the HMD device 100 also displays a holographic element with the baton 300 in the form f a holographic ball 420 on the end of the baton 300. In FIG. 4 Andy 320 is holding the baton 300 at a distance D1 from the holographic paint can 410. FIG. 4 also schematically shows a distance P1 from the holographic paint can 410 (indicated by dashed line 430) that corresponds to a predetermined proximity to the paint can. In various examples such distance P1 representing a predetermined proximity may be 1 cm., 50 cm., or any suitable distance.

Figure 5:
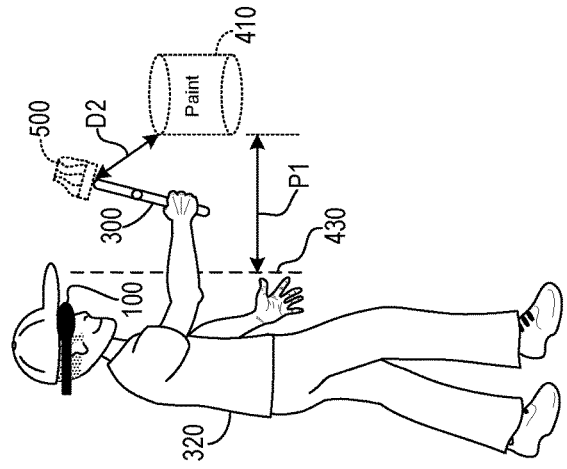
FIGS. 4 and 5 show a holographic element of a control device being modified according to an example of the present description.

With reference now to FIG. 5, user Andy 320 has moved closer to the holographic paint can 410 to a position in which the baton 300 is a distance D2 from the holographic paint can 410. As schematically shown in FIG. 5, the distance D2 of the baton 300 is less than the predetermined proximity of distance P1 from the holographic paint can 410. In other words, the baton 300 is within the predetermined proximity of the holographic paint can 410.

Using at least the position information received from the baton 300, the HMD device 100 may determine that the baton is within the predetermined proximity of the holographic paint can 410. Based at least in part on determining that the baton 300 is within the predetermined proximity, the holographic element display program 200 of HMD device 100 may modify the holographic ball 420 shown in FIG. 4 to a holographic paint brush 500 as shown FIG. 5.

Accordingly, as user Andy 320 moves the baton 300 to within the predetermined proximity of the holographic paint can 410, the holographic element displayed with the baton may be programmatically modified to the holographic paint brush 500. In this manner, the HMD device 100 provides visual feedback to Andy 320 that communicates a new capability of the baton 300—in this example, that the baton may function as a paint brush tool and may be used with the holographic paint can 410.

For example, when Andy 320 "touches" the holographic paint can 410 with the holographic brush 500 (i.e., causes at least a portion of the holographic brush to be co-located with a portion of the holographic paint can in the 3D model of the physical environment), the baton 300 may acquire the capability to virtually draw or paint on physical surfaces and/or other holographic objects with the brush. For example, when Andy 320 touches the holographic paint can 410 with the holographic brush 500 and then touches the brush to the physical table 360 in room 310, the HMD device 100 may display holographic paint on the touched surface(s) of the table. In a similar manner, Andy 320 may use the holographic brush 500 to write or draw on a holographic surface, such as a holographic canvas.

Further, in this example the new capability of the baton 300 (its holographic painting or drawing capability), which is displayed to Andy via the holographic brush 500 when the baton is within the predetermined proximity of the holographic paint can 410, is related to the holographic paint can as it enables the brush to paint or draw with holographic paint from the paint can. Accordingly, modifying the holographic ball 420 in this manner as Andy moves the baton 300 to within the predetermined proximity communicates to Andy that this new capability of the brush is related to the holographic paint can.

In another example and with reference to FIG. 3, the holographic sword 330 held by Andy 320 may be modified to indicate a new capability. For example, while holding the baton 300 and holographic sword 330, Andy may approach a holographic block of ice. When the baton 300 is within a predetermined proximity of the holographic block of ice, the HMD device 100 may modify the holographic sword 330 to display holographic fire encircling the blade of the sword. In this manner, by displaying the holographic fire as the holographic sword 330 and baton 300 approach the holographic block of ice, the HMD device 100 may indicate a new capability of the holographic sword 330 to slice through the holographic block of ice.

Further, in this example the new capability of the holographic sword 330 (its fiery ice-slicing quality), which is displayed to Andy when the baton 300 is within the predetermined proximity of the holographic block of ice, is related to the holographic block of ice, as it enables the sword to slice through the ice. Accordingly, modifying the holographic sword in this manner as Andy moves the baton 300 to within the predetermined proximity communicates to Andy that this new capability of the sword is related to the holographic block of ice.

In other examples, a holographic element may be modified to indicate a new capability when the control device moves to within a predetermined proximity of a physical object. For example and with continued reference to FIG. 3, Greg 340 may walk to and sit down on the physical couch 370. When Greg's wrist-worn band 304 is within a predetermined proximity of the couch 370, such as within 50 cm., the HMD device 100 may modify the holographic shield 350 to a holographic media reader displaying the book Greg is currently reading (which he regularly reads via the holographic media reader while sitting on the couch). In this manner, by displaying the media reader as the band 304 moves to within the predetermined proximity of the couch 370, the HMD device 100 may indicate a new capability of the band.

A holographic element also may be modified in a variety of manners to visually communicate a variety of different capabilities of the associated control device. In some examples, the modified holographic element may comprise one of a variety of tools, such as a paintbrush, pencil, pen or other drawing instrument, hammer, flashlight, etc. In examples comprising a hand-held control device, such as the baton 300, the modified holographic element may be displayed as an extension of the device.

In some examples, the holographic element may be modified to indicate different modes of a single tool. For example and with reference to FIG. 5, a color of the brush 500 may be modified to indicate a different color of holographic paint that will be displayed when the brush engages with a physical or holographic object. For example, touching the brush 500 to different holographic paint cans may enable the brush to paint with different colors of holographic paint. In these examples, when the holographic brush 500 displayed in a first color touches a particular holographic paint can associated with a second different color, the color of the brush may be changed to the second different color.

In some examples the control device may comprise one or more light sources that may be illuminated based upon the position of the control device relative to a holographic object or physical object. With reference again to FIG. 4, in one example the baton 300 may include a light source 380, such as an LED light source. When the baton 300 is determined to be within the predetermined proximity of the holographic paint can 410, the light output of the LED light source 380 may be modified. For example, when the baton 300 is not within the predetermined proximity the LED light source 380 may be illuminated in a first color, and when the baton 300 is within the predetermined proximity the LED light source may be illuminated in a second, different color. In other examples, the light output of the LED light source may be increased or decreased, modified to change a pattern of flashing, or modified in any other suitable manner to indicate that the baton 300 is within a predetermined proximity of a holographic object or a physical object.

With reference now to FIGS. 6, 7 and 8, in one example modifying the holographic element may provide visual feedback indicating an amount of pressure applied to another holographic object or to a physical object. As shown in FIG. 6, in one example a user (not shown) may move the baton 300 in the direction of action arrow A toward a physical easel 600 that supports a physical painting surface 620. At this point the HMD device 100 may display a placeholder holographic element with the baton 300, such as holographic ball 420.

As shown in FIG. 7, when a portion of the baton 300 passes dashed line 610 (denoting a predetermined proximity to the surface 620), the holographic ball 420 is modified to a holographic paint brush 500. The baton 300 may continue to be moved toward the easel 600 until a leading edge 510 of the holographic paint brush 500 "touches" (or is co-located with) the painting surface 620 of the easel. In some examples, at this point the holographic paint brush 500 may holographically mark the painting surface 620, such as by leaving holographic paint displayed on those portions of the painting surface 620 that the brush touches. Further and as explained below, a user may vary the virtual pressure applied by the brush 500 to the painting surface 620 by varying the distance of the baton 300 to the surface. In some examples, applying different virtual pressure via positioning the holographic brush 500 may vary a width, shade, density, or other visual characteristic of the holographic paint or other virtual marking material that is displayed on the painting surface 620.

For example and with reference now to FIG. 8, after the leading edge 510 touches the top surface 620, the baton 300 may continue moving in the direction of action arrow A. In response, the visual depiction of the holographic paint brush 500 may be modified to indicate an amount of pressure applied to the top surface 620. For example and as shown in FIG. 8, the bristles of the holographic paint brush 500 may be displayed to curve away from the top surface 620 in general proportion to the distance of the baton 300 from the top surface. In other words, as the baton 300 moves closer to the top surface 620 (corresponding to an increasing amount of virtual pressure applied to the surface), the bristles of the brush 500 may be displayed to increasingly curve away from and flatten against the surface. As noted above and in some examples, as a user moves the baton 300 closer to the top surface 620 and the bristles of the brush 500 are displayed to increasingly curve away from the surface 620, a width of a holographic paint marking displayed on the surface where the brush contacts the surface may be correspondingly increased.

Figure 9:
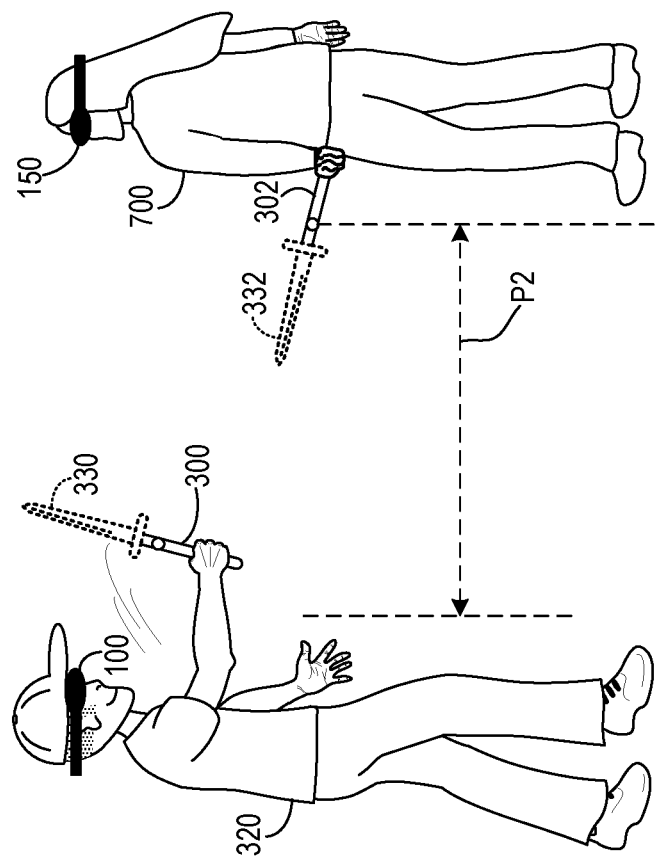
FIG. 9 shows a first holographic element displayed with a first control device and a second holographic element displayed with a second control device according to an example of the present description.

With reference now to FIG. 9, in some examples the HMD device 100 may modify another holographic element that is displayed via the HMD device with another control device. In the example of FIG. 9, user Andy 320 holds baton 300 while his HMD device 100 displays a holographic sword 330 with the baton 300 as described above. Another user Connie 700 also may wear an HMD device 150 that may have the same functionality as HMD device 100. Connie 700 may hold a portable control device in the form of baton 302, which may have the same functionality as baton 300.

As Andy 320 walks toward Connie 700, his baton 300 may move to within a predetermined proximity of Connie's baton 302. In this example, such predetermined proximity is defined as a distance P2 from the light source on baton 302. Based at least in part on determining that Andy's baton 300 is within the predetermined proximity of Connie's baton 302, Andy's HMD device 100 may display to Andy a holographic element with Connie's baton. In the example of FIG. 9, such holographic element is a holographic sword 332 displayed as extending from the baton 302. Accordingly and in one example, by moving his baton 300 within the predetermined proximity of Connie's baton 302, Andy 320 may trigger his HMD device 100 to display the sword 332 with Connie's baton 302, and to programmatically start sword fighting game with Connie.

Figure 10A:
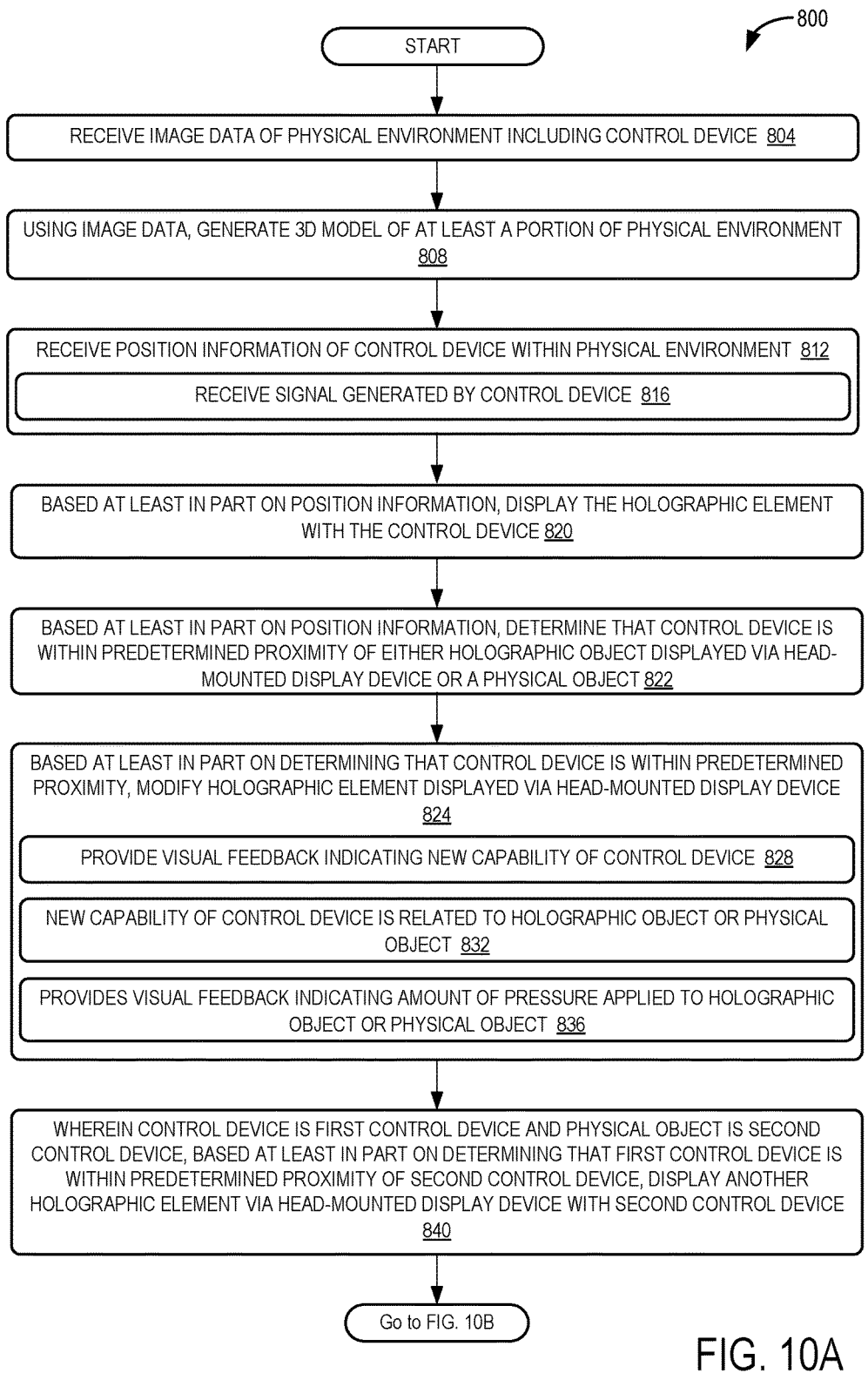
FIGS. 10A and 10B are a flow chart of a method for displaying via a head-mounted display device a holographic element with a portable control device according to an example of the present description.
Figure 10B:
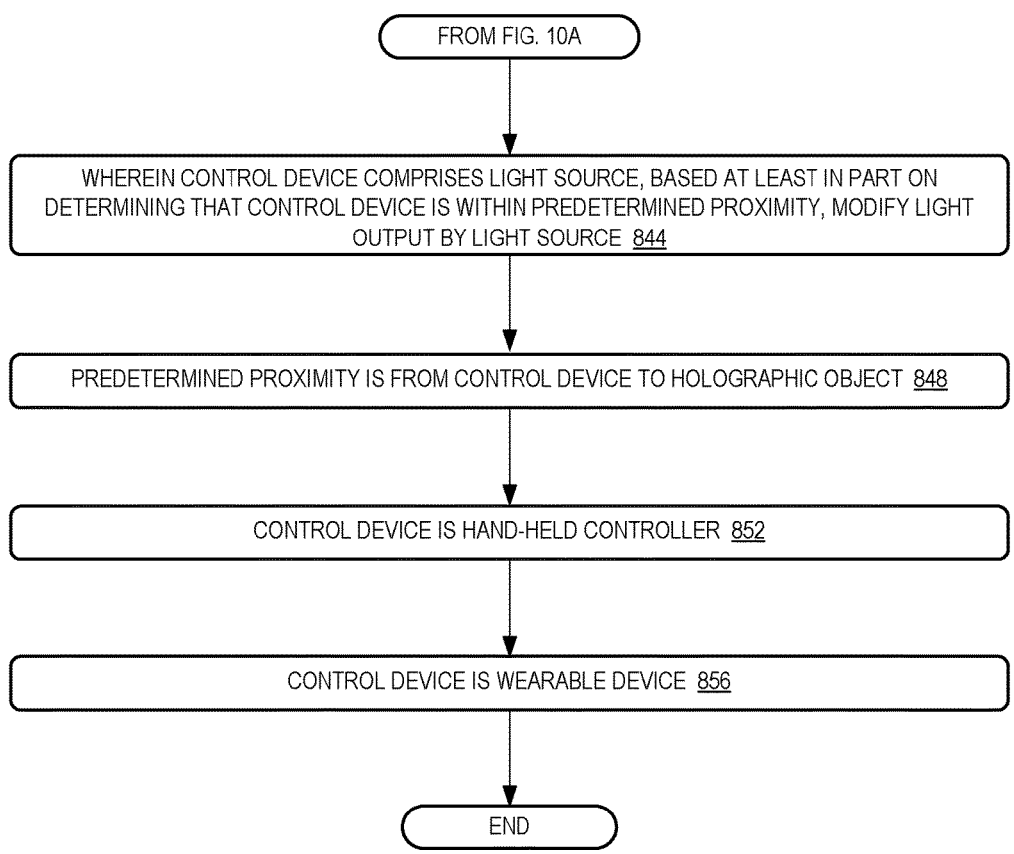

FIGS. 10A and 10B illustrate a flow chart of a method 800 for displaying via a head-mounted display device a holographic element with a portable control device according to an example of the present disclosure. The following description of method 800 is provided with reference to the software and hardware components described above and shown in FIGS. 1-9. It will be appreciated that method 800 also may be performed in other contexts using other suitable hardware and software components.

With reference to FIG. 10A, at 804 the method 800 may include receiving image data of a physical environment including the control device. At 808 the method 800 may include, using the image data, generating a three dimensional model of at least a portion of the physical environment. At 812 the method 800 may include receiving position information of the control device within the physical environment. At 816 the method 800 may include receiving the position information by receiving a signal generated by the control device. At 820 the method 800 may include, based at least in part on the position information, displaying the holographic element with the control device.

At 822 the method 800 may include, based at least in part on the position information, determining that the control device is within predetermined proximity of either a holographic object displayed via the head-mounted display device or a physical object. At 824 the method 800 may include, based at least in part on determining that the control device is within the predetermined proximity, modifying the holographic element displayed via the head-mounted display device.

At 828 the method 800 may include providing visual feedback indicating a new capability of the control device. At 832 the method 800 may include wherein the new capability of the control device is related to the holographic object or the physical object. At 836 the method 800 may include wherein modifying the holographic element provides visual feedback indicating an amount of pressure applied to the holographic object or the physical object.

At 840 the method 800 may include, wherein the control device is a first control device and the physical object is a second control device, based at least in part on determining that the first control device is within the predetermined proximity of the second control device, displaying another holographic element via the head-mounted display device with the second control device. With reference now to FIG. 10B, at 844 the method 800 may include wherein the control device comprises a light source, based at least in part on determining that the control device is within the predetermined proximity, modifying light output by the light source.

At 848 the method 800 may include wherein the predetermined proximity is from the control device to the holographic object displayed via the head-mounted display device. At 852 the method 800 may include wherein the control device is a hand-held controller. At 856 the method 800 may include wherein the control device is a wearable device.

It will be appreciated that method 800 is provided by way of example and is not meant to be limiting. Therefore, it is to be understood that method 800 may include additional and/or alternative steps relative to those illustrated in FIGS. 10A and 10B. Further, it is to be understood that method 800 may be performed in any suitable order. Further still, it is to be understood that one or more steps may be omitted from method 800 without departing from the scope of this disclosure.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
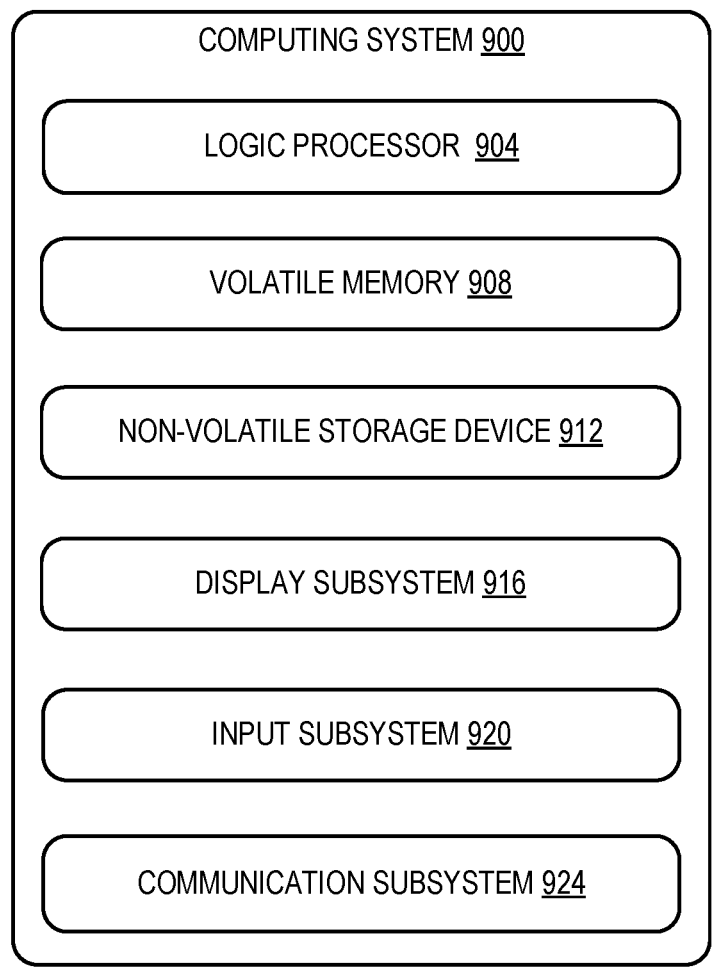
FIG. 11 shows a computing system according to an example of the present description.

FIG. 11 schematically shows a non-limiting embodiment of a computing system 900 that can enact one or more of the methods and processes described above. Computing system 900 is shown in simplified form. Computing system 900 may take the form of computing device 124 as shown in FIG. 1, or one or more other devices integrated in or otherwise communicatively coupled with head-mounted display device 100 (e.g., personal computers, server computers, tablet computers, home-entertainment computers, network computing devices, gaming devices mobile computing devices, mobile communication devices (e.g., smart phone), and/or other computing devices).

Computing system 900 includes a logic processor 904, volatile memory 908, and a non-volatile storage device 912. Computing system 900 may optionally include a display subsystem 916, input subsystem 920, communication subsystem 924, and/or other components not shown in FIG. 11.

Logic processor 904 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 904 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in cloud-computing configuration. In such a case, these virtualized aspects may be run on different physical logic processors of various different machines.

Volatile memory 908 may include physical devices that include random access memory. Volatile memory 908 is typically utilized by logic processor 904 to temporarily store information during processing of software instructions. It will be appreciated that volatile memory 908 typically does not continue to store instructions when power is cut to the volatile memory 908.

Non-volatile storage device 912 includes one or more physical devices configured to hold instructions executable by the logic processors to implement the methods and processes described herein. When such methods and processes are implemented, the state of non-volatile storage device 912 may be transformed—e.g., to different data.

Non-volatile storage device 912 may include physical devices that are removable and/or built-in. Non-volatile storage device 912 may include optical memory (e.g., CD, DVD, HD-DVD, Blu-Ray Disc, etc.), semiconductor memory (e.g., ROM, EPROM, PROM, FLASH memory, etc.), and/or magnetic memory hard-disk drive, floppy-disk drive, tape drive, MRAM, etc.), or other mass storage device technology. Non-volatile storage device 912 may include nonvolatile, dynamic, static, read/write, read-only, sequential-access, location-addressable, file-addressable, and/or content-addressable devices. It will be appreciated that non-volatile storage device 912 is configured to hold instructions even when power is cut to the non-volatile storage device 912.

Aspects of logic processor 904, volatile memory 908, and non-volatile storage device 912 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 900 implemented to perform a particular function. In some cases, a program may be instantiated via logic processor 904 executing instructions held by non-volatile storage device 912, using portions of volatile memory 908. It will be understood that different programs may be instantiated from the same application, service, code block, object, library, routine, API, function, etc. Likewise, the same program may be instantiated by different applications, services, code blocks, objects, routines, APIs, functions etc. The term "program" encompasses individual or groups of executable files, data files, libraries, drivers, scripts, database records, etc.

When included, display subsystem 916 may be used to present a visual representation of data held by non-volatile storage device 912. As the herein described methods and processes change the data held by the non-volatile storage device, and thus transform the state of the non-volatile storage device, the state of display subsystem 916 may likewise be transformed to visually represent changes in the underlying data. Display subsystem 916 may include one or more display devices utilizing virtually any type of technology. Such display devices may be combined with logic processor 904, volatile memory 908, and/or non-volatile storage device 912 in a shared enclosure. With respect to the example HMD device 100 of FIG. 1, the display panels 104R and 104L configured to visually augment an appearance of a real-world, three dimensional physical environment by displaying virtual objects such as holograms are an example of a display subsystem 916.

When included, input subsystem 920 may comprise or interface with one or more user-input devices. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; electric-field sensing componentry for assessing brain activity; any of the sensors described above with respect to HMD device 100; and/or any other suitable sensor.

When included, communication subsystem 924 may be configured to communicatively couple computing system 900 with one or more other computing devices. Communication subsystem 924 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

The following paragraphs provide additional support for the claims of the subject application. One aspect provides a method for displaying via a head-mounted display device a holographic element with a portable control device, the method comprising: receiving image data of a physical environment including the control device; using the image data, generating a three dimensional model of at least a portion of the physical environment; receiving position information A the control device within the physical environment; based at least in part on the position information, displaying the holographic element with the control device; based at least in part on the position information, determining that the control device is within a predetermined proximity of either a holographic object displayed via the head-mounted display device or a physical object; and based at least in part on determining that the control device is within the predetermined proximity, modifying the holographic element displayed via the head-mounted display device. The method may additionally or optionally include, wherein modifying the holographic element comprises providing visual feedback indicating a new capability of the control device. The method may additionally or optionally include, wherein the new capability of the control device is related to the holographic object or the physical object. The method may additionally or optionally include, wherein modifying the holographic element comprises providing visual feedback indicating an amount of pressure applied to the holographic object or the physical object. The method may additionally or optionally include, wherein the control device is a first control device and the physical object is a second control device, the method further comprising, based at least in part on determining that the first control device is within the predetermined proximity of the second control device, displaying another holographic element via the head-mounted display device with the second control device. The method may additionally or optionally include, wherein the control device comprises a light source, the method further comprising, based at least in part on determining that the control device is within the predetermined proximity, modifying light output by the light source. The method may additionally or optionally include, wherein the predetermined proximity is from the control device to the holographic object displayed via the head-mounted display device. The method may additionally or optionally include, wherein the control device is a hand-held controller. The method may additionally or optionally include, wherein the control device is a wearable device. The method may additionally or optionally include, wherein receiving the position information comprises receiving a signal generated by the control device.

Another aspect provides a head-mounted display device, comprising: an at least partially see-through display; a processor; and a memory holding instructions executable by the processor to: receive image data of a physical environment including a control device; using the image data, generating a three dimensional model of at least a portion of the physical environment; receive position information of the control device within the physical environment; based at least in part on the position information, display a holographic element with the control device based at least in part on the position information, determine that the control device is within a predetermined proximity of either a holographic object displayed via, the head-mounted display device or a physical object; and based at least in part on determining that the control device is within the predetermined proximity, modify the holographic element. The head-mounted display device may additionally or alternatively include, wherein modifying the holographic element comprises providing visual feedback indicating a new capability of the control device. The head-mounted display device may additionally or alternatively include, wherein the new capability of the control device is related to the holographic object or the physical object. The head-mounted display device may additionally or alternatively include, wherein the control device is a first control device and the physical object is a second control device, and the instructions are executable by the processor to, based at least in part on determining that the first control device is within the predetermined proximity of the second control device, display another holographic element via the head-mounted display device with the second control device. The head-mounted display device may additionally or alternatively include, wherein the control device comprises a light source and the instructions are executable by the processor to, based at least in part on determining that the control device is within the predetermined proximity, modify light output by the light source. The head-mounted display device may additionally or alternatively include, wherein the predetermined proximity is from the control device to the physical object. The head-mounted display device may additionally or alternatively include, wherein the control device is a hand-held controller. The head-mounted display device may additionally or alternatively include, wherein the control device is a wearable device. The head-mounted display device may additionally or alternatively include, wherein receiving the position information comprises receiving a signal generated by the control device.

Another aspect provides a method for displaying via a head-mounted display device a holographic element with a hand-held control device, the method comprising: receiving image data of a physical environment including the hand-held control device; using the image data, generating a three dimensional model of at least a portion of the physical environment; receiving position information of the control device within the physical environment; based at least in part on the position information, displaying the holographic element with the hand-held control device; based at least in part on the position information determining that the hand-held control device is within a predetermined proximity of either a holographic object displayed via the head-mounted display device or a physical object; and based at least in part on determining that the hand-held control device is within the predetermined proximity, modifying the holographic element displayed via the head-mounted display device to provide visual feedback indicating a new capability of the holographic element.

It will be understood that the configurations and/or approaches described herein are exemplary in nature, and that these specific embodiments or examples are not to be considered in limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for displaying via a head-mounted display device a holographic element with a portable control device, the method comprising:
   receiving image data of a physical environment including the control device;
   using the image data, generating a three dimensional model of at least a portion of the physical environment;
   receiving position information of the control device within the physical environment;
   based at least in part on the position information, displaying the holographic element in a world-locked manner with the control device;
   based at least in part on the position information, determining that the control device is within a predetermined proximity of either a holographic object displayed via the head-mounted display device or a physical object; and
   based at least in part on determining that the control device is within the predetermined proximity, modifying the holographic element displayed via the head-mounted display device.

2. The method of claim 1, wherein modifying the holographic element comprises providing visual feedback indicating a new capability of the control device.

3. The method of claim 2, wherein the new capability of the control device is related to the holographic object or the physical object.

4. The method of claim 1, wherein modifying the holographic element comprises providing visual feedback indicating an amount of pressure applied to the holographic object or the physical object.

5. The method of claim 1, wherein the control device is a first control device and the physical object is a second control device, the method further comprising, based at least in part on determining that the first control device is within the predetermined proximity of the second control device, displaying another holographic element via the head-mounted display device with the second control device.

6. The method of claim 1, wherein the control device comprises a light source, the method further comprising, based at least in part on determining that the control device is within the predetermined proximity, modifying light output by the light source.

7. The method of claim 6, wherein the predetermined proximity is from the control device to the holographic object displayed via the head-mounted display device.

8. The method of claim 1, wherein the control device is a hand-held controller.

9. The method of claim 1, wherein the control device is a wearable device.

10. The method of claim 1, wherein receiving the position information comprises receiving a signal generated by the control device.

11. A head-mounted display device, comprising:
an at least partially see-through display;
a processor; and
a memory holding instructions executable by the processor to:
receive image data of a physical environment including a control device;
using the image data, generating a three dimensional model of at least a portion of the physical environment;
receive position information of the control device within the physical environment;
based at least in part on the position information, display a holographic element in a world-locked manner with the control device;
based at least in part on the position information, determine that the control device is within a predetermined proximity of either a holographic object displayed via the head-mounted display device or a physical object; and
based at least in part on determining that the control device is within the predetermined proximity, modify the holographic element.

12. The head-mounted display device of claim 11, wherein modifying the holographic element comprises providing visual feedback indicating a new capability of the control device.

13. The head-mounted display device of claim 12, wherein the new capability of the control device is related to the holographic object or the physical object.

14. The head-mounted display device of claim 11, wherein the control device is a first control device and the physical object is a second control device, and the instructions are executable by the processor to, based at least in part on determining that the first control device is within the predetermined proximity of the second control device, display another holographic element via the head-mounted display device with the second control device.

15. The head-mounted display device of claim 11, wherein the control device comprises a light source and the instructions are executable by the processor to, based at least in part on determining that the control device is within the predetermined proximity, modify light output by the light source.

16. The head-mounted display device of claim 15, wherein the predetermined proximity is from the control device to the physical object.

17. The head-mounted display device of claim 11, wherein the control device is a hand-held controller.

18. The head-mounted display device of claim 11, wherein the control device is a wearable device.

19. The head-mounted display device of claim 11, wherein receiving the position information comprises receiving a signal generated by the control device.

20. A method for displaying via a head-mounted display device a holographic element with a hand-held control device, the method comprising:
receiving image data of a physical environment including the hand-held control device;
using the image data, generating a three dimensional model of at least a portion of the physical environment;
receiving position information of the control device within the physical environment;
based at least in part on the position information, displaying the holographic element in a world-locked manner with the hand-held control device;
based at least in part on the position information, determining that the hand-held control device is within a predetermined proximity of either a holographic object displayed via the head-mounted display device or a physical object; and
based at least in part on determining that the hand-held control device is within the predetermined proximity, modifying the holographic element displayed via the head-mounted display device to provide visual feedback indicating a new capability of the holographic element.

* * * * *